United States Patent [19]

Speakman

[11] 3,948,790

[45] Apr. 6, 1976

[54] DETERGENT COMPOSITIONS CONTAINING SHORT CHAIN QUATERNARY AMMONIUM CLAYS

[75] Inventor: Peter Roscoe Hartley Speakman, Newcastle-upon-Tyne, England

[73] Assignee: The Procter & Gamble Company, Cincinnati, Ohio

[22] Filed: Jan. 27, 1975

[21] Appl. No.: 544,092

[30] Foreign Application Priority Data

Jan. 31, 1974 United Kingdom.............. 4578/74

[52] U.S. Cl. ................ 252/120; 252/8.75; 252/8.8; 252/113; 252/129; 252/131; 252/155; 252/179; 252/528; 252/547; 260/448 C

[51] Int. Cl.$^2$... C07F 5/06; C11D 3/12; C11D 9/18; D06M 11/00

[58] Field of Search ............ 252/8.6, 8.75, 8.8, 113, 252/119, 120, 129, 131, 528, 140, 547, 155, 179; 260/448 C

[56] References Cited

UNITED STATES PATENTS

| | | | |
|---|---|---|---|
| 2,531,427 | 11/1950 | Hauser | 260/448 C |
| 2,746,887 | 5/1956 | O'Neil | 252/8.6 X |
| 3,012,050 | 12/1961 | Fox | 260/448 C |
| 3,095,373 | 6/1963 | Blomfield | 252/8.8 |
| 3,716,488 | 2/1973 | Kolsky | 252/120 X |
| 3,765,911 | 10/1973 | Knowles | 252/131 X |
| 3,852,211 | 12/1974 | Ohren | 252/110 |
| 3,862,058 | 1/1975 | Nirschl | 252/528 |

*Primary Examiner*—Dennis L. Albrecht
*Attorney, Agent, or Firm*—Richard C. Witte; Thomas H. O'Flaherty; Forrest L. Collins

[57] ABSTRACT

The present invention relates to detergent compositions comprising certain organophilic clays, which compositions impart a soft feel to fabrics washed therein.

17 Claims, No Drawings

DETERGENT COMPOSITIONS CONTAINING SHORT CHAIN QUATERNARY AMMONIUM CLAYS

BACKGROUND OF THE INVENTION

Belgian Pat. No. 802,309, U.S. Pat. Nos. 3,852,211 to Ohren, issued Dec. 3, 1974, and 3,862,058, Nirschl et al. issued Jan. 21, 1975, incorporated by reference, describe the use of certain smectite clays in, respectively, built synthetic detergent compositions and curd-dispersant soap-based detergent compositions. The exchangeable cations of the clays described are hydrogen, sodium, potassium, calcium, or magnesium. These clays are effective in products based upon anionic, ampholytic, and zwitterionic detergents, but are much less effective in the presence of significant amounts of nonionic detergents. Of recent years, it is being found more and more that nonionic detergents have special advantages as the active surfactant component of detergent compositions, and there is a need for a fabric-softening agent effective in such compositions.

The Nirschl patent describes the use of long-chain quaternary ammonium salts such as halides with clays wherein it is stated that the clay does not substantially undergo ion exchange with the clays employed in the wash solution.

It has now been found that replacing to a suitable degree the above-mentioned exchangeable metal ions of the clays by relatively short-chained quaternary ammonium ions provides modified, more organophilic, forms of the clays which are effective softeners in the presence of nonionic surfactants.

It is thus an object of the present invention to provide a detergent composition containing a quaternary ammonium clay. A further object of the invention is to provide an effective clay softener for use with nonionic detergents.

SUMMARY OF THE INVENTION

A detergent composition comprising from about 5 to about 99% by weight of an organic anionic, nonionic, ampholytic, or zwitterionic detergent, or a mixture thereof, and from about 1 to about 50% by weight of the composition of an impalpable smectite clay having an ion-exchange capacity of at least about 50 meq/100 grams, in which clay from about 5 to about 100 molar percent of the exchangeable cations are alkyl-substituted ammonium ions of the general formula $R^1R^2R^3R^4N^+$ wherein each of $R^1$, $R^2$, $R^3$, and $R^4$ represents an alkyl group having 1 to 4 carbon atoms or hydrogen, provided that the total number of carbon atoms does not exceed 8, and that not more than any two of $R^1$, $R^2$, $R^3$, and $R^4$ represent hydrogen.

DETAILED DESCRIPTION OF THE INVENTION

Accordingly, the invention provides a detergent composition comprising from about 5 to about 99% preferably about 10 to about 40% of an organic anionic, nonionic, ampholytic, or zwitterionic detergent, or a mixture thereof, and from 1% to 50% by weight of the composition of an impalpable semctite-type clay having an ion-exchange capacity of at least 50 meq/100 grams, in which clay from about 5 to 100 preferably about 10 to 60 molar percent of the exchangeable cations are alkyl-substituted ammonium ions of the general formula $R^1R^2R^3R^4N^+$ wherein each $R^1$, $R^2$, $R^3$, $R^4$ represents an alkyl group having 1 to 4 carbon atoms or hydrogen, provided that the total number of carbon atoms does not exceed 8, and that not more than two R's each represent hydrogen.

Preferably, all the R's are alkyl, since compositions wherein —NH or —$NH_2$ is present may tend to develop odor aesthetic problems in alkaline detergent compositions.

Preferably, the clay constitutes about 4–25%, especially about 5–15% by weight of the composition.

It will be convenient to refer to the clays as QA (quaternary ammonium) clays. Like the metal clays described in the above-mentioned Belgian and United States patents, these QA clays have a softening effect in detergent compositions based upon anionic, zwitterionic, or ampholytic surfactants in the absence of nonionic surfactants. Unlike the said metal clays, however, they retain their effectiveness in the presence of nonionics. Thus they are preferably employed in detergent compositions wherein not more than 80% and especially not more than 20% of the organic surfactant is anionic. Thus they are very valuable in nonionic or nonionic/zwitterionic based detergent compositions containing no soap or synthetic anionic surfactant or containing only small quantities primarily intended as suds-controlling agents or as density aids in controlling the spray drying process.

Compositions based primarily on synthetic organic detergents normally contain from about 2 to about 30% by weight of organic surfactant, preferably from about 5 to about 20%. Of course, these primarily synthetic detergent compositions may contain small amounts of soaps for special purposes. Examples of suitable anionic, ampholytic, and zwitterionic surfactants are given in Belgian Pat. No. 802,309.

Most commonly, nonionic surfactants are compounds produced by the condensation of an alkylene oxide (hydrophilic in nature) with an organic hydrophobic compound which is usually aliphatic or alkyl aromatic in nature. The length of the hydrophilic or polyoxyalkylene moiety which is condensed with any particular hydrophobic compound can be readily adjusted to yield a water-soluble compound having the desired degree of balance between hydrophilic and hydrophobic elements. Nonionic surfactants of another type are the so-called polar nonionics derived from amine oxides, phosphine oxides, or sulfoxides. Examples of suitable nonionic surfactants include:

1. The polyethylene oxide condensates of alkyl phenols. These compounds include the condensation products of alkyl phenols having an alkyl group containing from about 6 to 12 carbon atoms in either a straight-chain or branched-chain configuration, with ethylene oxide, the said ethylene oxide being present in amounts equal to 5 to 25 moles of ethylene oxide per mole of alkyl phenol. The alkyl substituent in such compounds may be derived, for example, from polymerized propylene, diisobutylene, octene, or nonene. Examples of this type include nonyl phenol condensed with about 9.5 moles of ethylene oxide per mole of nonyl phenol, dodecyl phenol condensed with about 12 moles of ethylene oxide per mole of phenol, dinonyl phenol condensed with about 15 moles of ethylene oxide per mole of phenol, di-isooctylphenol condensed with about 15 moles of ethylene oxide per mole of phenol. Commercially available nonionic surfactants of this type include Igepal CO-610 marketed by the GAF Corporation, and Triton X-45, X-114, X-100, and X-102, all marketed by the Rohm and Haas Company.

2. The condensation products of aliphatic alcohols with ethylene oxide. The alkyl chain of the aliphatic alcohol may either be straight or branched, primary or secondary and generally contains from about 8 to about 22 carbon atoms. Examples of such ethoxylated alcohols include the condensation product of about 6 moles of ethylene oxide with 1 mole of tridecanol, myristyl alcohol condensed with about 10 moles of ethylene oxide per more of myristyl alcohol, the condensation product of ethylene oxide with coconut fatty alcohol wherein the coconut alcohol is a mixture of fatty alcohols with alkyl chains varying from 10 to 14 carbon atoms and wherein the condensate contains from 6 moles of ethylene oxide per mole of alcohol, and the condensation product of about 9 moles of ethylene oxide with the above-described coconut alcohol. Examples of commercially available nonionic surfactants of this type include Tergitol 15-S-9 marketed by the Union Carbide Corporation, Neodol 23-6.5 marketed by the Shell Chemical Company and Kyro EOB marketed by The Procter & Gamble Company.

Other ethylene oxide condensates useful herein include those described in U.S. Pat. applications Ser. No. 406,413, filed Oct. 15, 1973, Ser. No. 453,464 filed Mar. 21, 1974, and Ser. No. 453,470 filed Mar. 21, 1974 to Collins, Collins, and Collins et al respectively, all of which are incorporated by reference.

3. The condensation products of ethylene oxide with a hydrophobic base formed by the condensation of propylene oxide with propylene glycol. The hydrophobic portion of these compounds has a molecular weight of from about 1500 to 1800 and of course exhibits water insolubility. The addition of polyoxyethylene moieties to this hydrophobic portion tends to increase the water-solubility of the molecule as a whole, and the liquid character of the product is retained up to the point where the polyoxyethylene content is about 50% of the total weight of the condensation product. Examples of compounds of this type include certain of the commercially available Pluronic surfactants marketed by the Wyandotte Chemical Corporation.

4. The condensation products of ethylene oxide with the product resulting from the reaction of propylene oxide and ethylene diamine. The hydrophobic base of these products consists of the reaction product of ethylene diamine and excess propylene oxide, said base having a molecular weight of from about 2500 to about 3000. This base is condensed with ethylene oxide to the extent that the condensation product contains from about 40 to about 80% by weight of polyoxyethylene and has a molecular weight of from about 5,000 to about 11,000. Examples of this type of nonionic surfactant include certain of the commercially available Tetronic compounds marketed by the Wyandotte Chemical Corporation.

5. Surfactants having the general formula $R^1R^2R^3N \longrightarrow O$ (amine oxide surfactants) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and no ether linkages, and each of $R^2$ and $R^3$ is selected from the group consisting of alkyl groups and hydroxyalkyl groups containing from 1 to about 3 carbon atoms.

Specific examples of amine oxide surfactants include: dimethyldodecylamine oxide, dimethyltetradecylamine oxide, ethylmethyltetradecylamine oxide, cetyldimethylamine oxide, dimethylstearylamine oxide, cetylethylpropylamine oxide, diethyldodecylamine oxide, diethyltetradecylamine oxide, dipropyldodecylamine oxide, bis-(2-hydroxyethyl)dodecylamine oxide, bis-(2-hydroxyethyl)-3-dodecoxy-1-hydroxypropylamine oxide, (2-hydroxypropyl)methyltetradecylamine oxide, dimethyloleylamine oxide, dimethyl-(2-hydroxydodecyl)amine oxide, and the corresponding decyl, hexadecyl and octadecyl homologs of the above compounds.

6. Surfactants having the general formula $R^1R^2R^3P \longrightarrow O$ (phosphine oxide surfactants) wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and no ether linkages, and each of $R^2$ and $R^3$ is selected from the group consisting of alkyl groups and hydroxyalkyl groups containing from 1 to about 3 carbon atoms.

Specific examples of the phosphine oxide detergents include: dimethyldodecylphosphine oxide, dimethyltetradecylphosphine oxide, ethylmethyltetradecylphosphine oxide, cetyldimethylphosphine oxide, dimethylstearylphosphine oxide, cetylethylpropylphosphine oxide, diethyldodecylphosphine oxide, diethyltetradecylphosphine oxide, dipropyldodecylphosphine oxide, dipropyltetradecylphosphine oxide, bis(hydroxymethyl)-dodecylphosphine oxide, bis-(2-hydroxyethyl)-dodecylphosphine oxide, (2-hydroxypropyl)methyltetradecylphosphine oxide, dimethyloleylphosphine oxide, and dimethyl-(2-hydroxydodecyl)phosphine oxide and the corresponding decyl, hexadecyl, and octadecyl homologs of the above compounds.

7. Surfactants having the general formula $$R^1-\overset{\overset{O}{\uparrow}}{S}-R^2$$

(sulfoxide surfactants) wherein $R^1$ is an alkyl group containing from about 10 to about 28 carbon atoms, from 0 to about 5 ether linkages and from 0 to about 2 hydroxyl substituents, at least one moiety of $R^1$ being an alkyl group containing no ether linkages and containing from about 10 to about 18 carbon atoms, and wherein $R^2$ is an alkyl group containing from 1 to 3 carbon atoms and from 0 to 2 hydroxyl groups. Specific examples of sulfoxide surfactants include octadecyl methylsulfoxide, dodecyl methylsulfoxide, tetradecyl methylsulfoxide, 3-hydroxytridecyl methylsulfoxide, 3-methoxytridecyl methylsulfoxide, 3-hydroxy-4-dodecoxybutyl methylsulfoxide, octadecyl-2-hydroxyethyl sulfoxide, and dodecylethyl sulfoxide.

Of all the above-described types of nonionic surfactants, preferred nonionic surfactants include the condensation product of nonyl phenol with about 9.5 moles of ethylene oxide per mole of nonyl phenol, the condensation product of coconut fatty alcohol with about 6 moles of ethylene oxide per mole of coconut fatty alcohol, the condensation product of tallow fatty alcohol with about 11 moles of ethylene oxide per mole of tallow fatty alcohol the condensation product of a secondary fatty alcohol containing about 11–15 carbon atoms with about 9 moles of ethylene oxide per mole of fatty alcohol and condensation products of more or less branched primary alcohols, whose branching is predominantly 2-methyl, with from 4–12 moles of ethylene oxide.

Suitable anionic detergents include:

1. Anionic organic detergents which are alkali metal, ammonium and substituted-ammonium salts of esters of $\alpha$-sulfonated fatty acids in which the esters contain about 12 to about 25 carbon atoms.

These detergent compounds have the following structure:

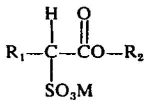

wherein $R_1$ is an alkyl or alkenyl moiety of about 10 to about 20 carbon atoms (forming with the two carbon atoms a fatty acid group); $R_2$ is alkyl of 1 to about 10 carbon atoms; and M is a salt-forming moiety.

The salt-forming moiety M in the hereinbefore described structural formula is a water-solubilizing cation and can be, for example, an alkali metal cation (e.g., sodium, potassium, lithium), ammonium or substituted ammonium cation. Specific examples of substituted ammonium cations include methyl-, dimethyl-, trimethyl-ammonium and triethanolammonium cations and quaternary ammonium cations such as tetramethyl ammonium and dimethyl piperidinium cations and those derived from alkylamines such as ethylamine, diethylamine, triethylamine, mixtures thereof and the like.

Specific examples of this class of compounds include the sodium and potassium salts of esters where $R_2$ is selected from methyl, ethyl, propyl, butyl, hexyl and octyl groups and the fatty acid group ($R_1$ plus the two carbon atoms in the structure above) is selected from lauric, myristic, palmitic, stearic, palmitoleic, oleic, linoleic acids and mixtures thereof. A preferred ester material herein is the sodium salt of the methyl ester of $\alpha$-sulfonated tallow fatty acid, the term tallow indicating a carbon chain distribution approximately as follows: $C_{14}$ - 2.5%, $C_{16}$ - 28%, $C_{18}$ - 23%, palmitoleic - 2%, oleic - 41.5%, and linoleic - 3% (the first three fatty acids listed are saturated).

Other examples of suitable salts of $\alpha$-sulfonated fatty esters utilizable herein include the ammonium and tetramethylammonium salts of the hexyl, octyl, ethyl, and butyl esters of $\alpha$-sulfonated trideconoic acid; the potassium and sodium salts of the ethyl, butyl, hexyl, octyl, and decyl esters of $\alpha$-sulfonated pentadecanoic acid; and the sodium and potassium salts of the butyl, hexyl, octyl, and decyl esters of $\alpha$-sulfonated heptadecanoic acid; and the lithium and ammonium salts of the butyl, hexyl, octyl, and decyl esters of $\alpha$-sulfonated nonadecanoic acid.

The salts of $\alpha$-sulfonated fatty acid esters of the present invention are known compounds and are described in U.S. Pat. No. 3,223,645, issued Dec. 14, 1965 to Kalberg, this patent being hereby incorporated by reference.

2. Anionic organic detergents which are salts of 2-acyloxy-alkane-1-sulfonic acids.

These salts have the formula:

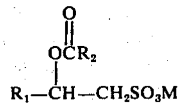

where $R_1$ is alkyl of about 9 to about 23 carbon atoms; $R_2$ is alkyl of 1 to about 8 carbon atoms; and M is a salt-forming moiety as hereinbefore described.

Specific examples of $\beta$-acyloxy-alkane-1-sulfonates, or alternatively, 2-acyloxy-alkane-1-sulfonates, utilizable herein to provide superior curd dispersion include the sodium salt of 2-acetoxy-tridecane-1-sulfonic acid; the potassium salt of 2-propionyloxy-tetradecane-1-sulfonic acid; the lithium salt of 2-butanoyloxy-tetradecane-1-sulfonic acid; the sodium salt of 2-pentanoyloxy-pentadecane-1-sulfonic acid; the ammonium salt of 2-hexanoyloxy-hexadecane-1-sulfonic acid; the sodium salt of 2-acetoxy-hexadecane-1-sulfonic acid; the dimethylammonium salt of 2-heptanoyloxy-tridecane-1-sulfonic acid; the potassium salt of 2-octanoyloxy-tetradecane-1-sulfonic acid; the dimethylpiperidinium salt of 2-nonanoyloxytetradecane-1-sulfonic acid; the sodium salt of 2-acetoxyheptadecane-1-sulfonic acid; the lithium salt of 2-acetoxyoctadecane-1-sulfonic acid; the dimethylamine salt of 2-acetoxyoctadecane-1-sulfonic acid; the potassium salt of 2-acetoxynonadecane-1=sulfonic acid; the sodium salt of 2-acetoxy-eicosane-1-sulfonic acid; the sodium salt of 2-propionyloxydocosane-1-sulfonic acid; and isomers thereof.

Preferred $\beta$-acyloxy-alkane-1-sulfonate salts herein are the alkali metal salts of $\beta$-acetoxy-alkane-1-sulfonic acids corresponding to the above formula wherein $R_1$ is an alkyl moiety of about 12 to about 16 carbon atoms, these salts being preferred from the standpoint of their excellent curd-dispersing properties and ready availability.

Typical examples of the above-described $\beta$-acetoxy alkanesulfonates are described in the literature: Belgian Pat. No. 650,323 issued July 9, 1963, discloses the preparation of certain 2-acyloxy alkanesulfonic acids. Similarly, U.S. Pat. No. 2,094,451 issued September 28, 1937 to Guenther et al. and 2,086,215 issued July 6, 1937 to De Groote disclose certain salts of $\beta$-acetoxy alkanesulfonic acids. These patents are hereby incorporated by reference.

3. Anionic organic detergents which are alkyl ether sulfates.

These materials have the formula $RO(C_2H_4O)_xSO_3M$ wherein R is an alkyl or alkenyl moiety of about 10 to about 20 carbon atoms, $x$ is 1 to 30, and M is a salt-forming cation as defined hereinbefore.

The alkyl ether sulfates useful in the present invention as curd dispersants are condensation products of ethylene oxide and monohydric alcohols having about 10 to about 20 carbon atoms. Preferably, R has 14 to 18 carbon atoms. The alcohols can be derived from fats, e.g. coconut oil or tallow, or can be synthetic. Lauryl alcohol and straight chain alcohols derived from tallow are preferred herein. Such alcohols are reacted with 1 to 30, and especially 3 or 6, molar proportions of ethylene oxide and the resulting mixture of molecular species, having, for example, an average of 3 or 6 moles of ethylene oxide per mole of alcohol, is sulfated and neutralized.

Specific examples of alkyl ether sulfates of the present invention are sodium coconut alkyl ethylene glycol ether sulfate; lithium tallow alkyl trialkylene glycol ether sulfate; sodium tallow alkyl hexaoxyethylene sulfate; and ammonium tetradecyl octaoxyethylene sulfate.

Preferred herein for reasons of excellent curd-dispersing properties and ready availability are the alkali metal coconut- and tallow-alkyl oxyethylene ether sulfates having an average of about 3 to about 10 oxyethylene moieties. The alkyl ether sulfates of the present invention are known compounds and are described in U.S. Pat. No. 3,322,876 to Walker (July 25, 1967) incorporated herein by reference.

4. Anionic organic detergents which are olefin sulfonates having about 12 to about 24 carbon atoms.

The term "olefin sulfonates" is used herein to mean compounds which can be produced by the sulfonation of $\alpha$-olefins by means of uncomplexed sulfur trioxide, followed by neutralization of the acid reaction mixture using conditions such that any sultones which have been formed in the reaction are hydrolyzed to give the corresponding hydroxy-alkanesulfonates. The sulfur trioxide may be liquid or gaseous, and is usually, but not necessarily, diluted by inert diluents, for example by liquid $SO_2$, chlorinated hydrocarbon, etc., when used in the liquid form, or by air, nitrogen, gaseous $SO_2$, etc., when used in the gaseous form.

The $\alpha$-olefins from which the olefin sulfates are derived are mono-olefins having 12 to 24 carbon atoms, preferably 14 to 16 carbon atoms. Preferably, they are straight chain olefins. Examples of suitable 1-olefins include 1-dodecene; 1-tetradecene; 1-hexadecene; 1-octadecene; 1-eicosene and 1-tetracosene.

In addition to the true alkene sulfonates and a proportion of hydroxy alkanesulfonates, the olefin sulfonates can contain minor amounts of other materials, such as alkene disulfonates depending upon the reaction conditions, proportions of reactants, the nature of the starting olefins and impurities in the olefin stock and side reactions during the sulfonation process.

A preferred embodiment herein are those olefin sulfonates which are described completely in U.S. Pat. No. 3,332,880 issued July 25, 1967, to Kessler et al, hereby incorporated by reference.

Suitable ampholytic detergents include:

1. Ampholytic synthetic detergents which are derivatives of aliphatic secondary and tertiary amines in which the aliphatic group can be straight chain or branched and wherein one of the aliphatic substituents contains from about 8 to about 18 carbon atoms and one contains an anionic water solubilizing group, e.g., carboxy, sulfonate, sulfate, phosphate, or phosphonate.

These detergents have the formula

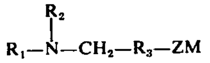

wherein $R_1$ is alkyl of about 8 to 18 carbon atoms, $R_2$ is alkyl of 1 to about 3 carbon atoms or is hydrogen, $R_3$ is alkylene of 1 to about 4 carbon atoms, Z is carboxy, sulfonate, sulfate, phosphate or phosphonate and M is a salt-forming cation, as hereinbefore described. Examples of compounds falling within this definition are sodium 3-dodecylaminopropionate; sodium 3-dodecylaminopropane sulfonate; N-alkyltaurines such as the ones prepared by reacting dodecylamine with sodium isethionate according to the teaching of U.S. Pat. No. 3,658,072; sodium salts of N-higher alkyl aspartic acids such as those produced according to the teaching of U.S. Pat. No. 3,438,091; and the products sold under the trade name "Miranol" and described in U.S. Pat. No. 2,528,378.

Suitable zwitterionic detergents include:

1. Zwitterionic synthetic detergents which are derivatives of aliphatic quaternary ammonium, phosphonium and sulfonium compounds, in which the aliphatic groups can be straight chain or branched, and wherein one of the aliphatic substituents contains from about 8 to 18 carbon atoms and one contains an anionic water solubilizing group, e.g., carboxy, sulfonate, sulfate, phosphate, or phosphonate. A general formula for these compounds is:

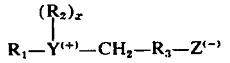

wherein $R_1$ is an alkyl, alkenyl, hydroxyalkyl or alkylbenzyl group containing from about 8 to about 24 carbon atoms and having from 0 to about 10 ethylene oxide moieties and from 0 to 1 glyceryl moiety; Y is selected from the group consisting of nitrogen, phosphorus, and sulfur atoms; $R_2$ is an alkyl or monohydroxyalkyl group containing 1 to about 3 carbon atoms; x is 1 when Y is a sulfur atom and 2 when Y is a nitrogen or phosphorus atom, $R_3$ is an alkylene or hydroxyl alkylene group of from 1 to about 4 carbon atoms and Z is a member selected from the group consisting of carboxylate, sulfonate, sulfate, phosphonate, and phosphate groups.

Examples include:

4-[N,N-di(2-hydroxyethyl)-N-octadecyl-ammonio]-butane-1-carboxylate;

5-[S-3-hydroxypropyl-S-hexadecylsulfonio]-3-hydroxy-pentane-1-sulfate;

3-[P,P-diethyl-P-3,6,9-trioxatetracosanephosphonio]-2-hydroxypropane-1-phosphate;

3-(N,N-dipropyl-N-3-dodecoxy-2-hydroxypropylammonio)-propane-1-phosphonate;

3-(N,N-dimethyl-N-hexadecylammonio)-2-hydroxy-propane-1-sulfonate;

4-[N,N-di(2-hydroxyethyl-N-(2-hydroxydodecyl-)ammonio]-butane-1-carboxylate;

3-[P,P-dimethyl-P-dodecylphosphonio]-propane-1-phosphonate;

S-[N,N-di(3-hydroxypropyl)-N-hexadecylammonio]-2-hydroxypentane-1-sulfate;

3-(dodecylbenzyldimethylammonio)propane-1-sulfonate; and 2-(dodecylbenzyldimethylammonio)ethane-1-sulfate.

Examples of compounds falling within this definition also include 3-(N,N-dimethyl-N-hexadecylammonio)-propane-1-sulfonate and 3-(N,N-dimethyl-N-hexadecylammonio)-2-hydroxypropane-1-sulfonate which are especially preferred herein for their availability and curd dispersant characteristics. Some of the compounds of this type as well as their use as dispersing agents are more fully described in U.S. Pat. Nos. 2,699,991 and 3,660,470 herein incorporated by reference.

Predominantly soap-based compositions usually contain from about 10 to about 60% by weight of soap, especially from about 20 to about 50%. Suitable soaps are described in U.S. Pat. No. 3,852,211. Preferred water-soluble soaps are sodium or potassium soaps having 12–18 carbon atoms in the molecule. The compositions may contain curd-dispersants, usually constituting from about 0.5 to about 20%, preferably from about 1 to 6%, by weight of the composition. Suitable curd-dispersants are described in U.S. Pat. No. 3,852,211, a preferred curd-dispersant is tallow monoethanolamide. Other suitable dispersants are the nonionic amine oxides, phosphine oxides and sulfoxides described above. Mixtures of soaps with the other synthetic detergents named herein may also be used.

The clay minerals whose exchangeable cations are exchanged with quaternary ammonium cations to provide the softening agents of the present compositions can be described as impalpable, expandable, three-layer clays, i.e., aluminosilicates and magnesium silicates, having an ion exchange capacity of at least 50 meq/100 grams of clay. The term "impalpable" as used to describe the clays employed herein means that the individual clay particles are of a size that they cannot be perceived tactilely. Such particle sizes are, in general, below 50 microns. Preferably, the clays herein will have a particle size within the range of from about 5 microns to about 25 microns. The term "expandable" as used to describe clays relates to the ability of the layered clay structure to be swollen, or expanded, on contact with water. The three-layer expandable clays used herein are those materials classified geologically as smectites.

There are two distinct classes of smectite clays. In the first, aluminium oxide is present in the silicate crystal lattice; in the second class of smectites, magnesium oxide is present in the silicate cyrstal lattice. The general formulas of these smectites are $Al_2(Si_2O_5)_2(OH)_2$ and $Mg_3(Si_2O_5)(OH)_2$ for the aluminium and magnesium oxide type clay, respectively. It is to be recognized that the range of the water of hydration in the above formulas can vary with the processing to which the clay has been subjected. This is immaterial to the use of the smectite clays in the present invention in that the expandable characteristics of the hydrated clays are dictated by the silicate lattice structure. Furthermore, atom substitution by iron and magnesium can occur within the crystal lattice of the smectites, while metal cations such as $Na^+$, $Ca^{++}$, as well as $H^+$, can be co-present in the water of hydration to provide electrical neutrality. Except as noted hereinafter, such cation substitutions are immaterial to the use of the clays to provide those used herein since the desirable physical properties of the clays are not substantially altered thereby.

The three-layer, expandable alumino silicates useful herein are further characterized by a dioctahedral crystal lattice, while the expandable three-layer magnesium silicates have a trioctahedral crystal lattice.

The clays from which the QA clays employed in the compositions of the present invention are derived can contain cationic counterions such as protons, sodium ions, potassium ions, calcium ions and magnesium ions. It is customary to distinguish between clays on the basis of one cation predominantly or exclusively absorbed. For example, a sodium clay is one in which the absorbed cation is predominantly sodium. Such absorbed cations can become involved in exchange reactions with cations present in aqueous solutions. A typical exchange reaction involving a smectite-type clay is expressed by the following equation:

$$\text{smectite clay (Na)} + NH_4OH \rightleftharpoons \text{smectite clay } (NH_4) + NaOH$$

Since in the foregoing equilibrium reaction, one equivalent weight of ammonium ion replaces an equivalent weight of sodium, it is customary to measure clay cation exchange capacity (sometimes termed "base exchange capacity") in terms of milli-equivalents per 100 grams of clay (meq/100 grams). The cation exchange capacity of clays can be measured in several ways, including by electrodialysis, by exchange with ammonium ion followed by titration, or by a methylene blue procedure, all as fully set forth in Grimshaw, The Chemistry and Physics of Clays, Interscience Publishers, Inc., pp. 264–265 (1971). The cation exchange capacity of a clay mineral relates to such factors as the expandable properties of the clay, the charge of the clay, which, in turn, is determined at least in part by the lattice structure. The ion exchange capacity of clays varies widely, from 2 meq/100 grams for kaolinites to 150 meq/100 grams and greater for certain clays of the montmorillonite variety. Illite clays have an ion exchange capacity somewhere in the lower portion of the range, e.g., around 26 meq/100 grams for an average illite clay.

It has been determined that illite and kaolinite clays, with their relatively low ion exchange capacities, are not useful for the present compositions. Indeed, such illite and kaolinite clays constitute a major component of clay soils and, are, in fact, removed from fabric surfaces by means of the present compositions. However, smectites, such as nontronite, having an ion exchange capacity of approximately 50 meq/100 grams saponite, which has an ion exchange capacity of about 70 meq/100 grams, and montmorillonite, which has an ion exchange capacity greater than 70 meq/100 grams, have been found to be useful for making the present compositions. This is so since such smectites, after conversion to QA clays, once added to laundering liquor, deposit on the fabrics to provide softening. Accordingly, clay minerals useful herein can be characterized as impalpable, expandable, three-layer smectite clays having an ion exchange capacity of at least 50 meq/100 grams.

The smectite clays used to make the clay components of the present invention are commercially available. Such clays include, for example, montmorillonite, hectorite, saponite which are preferred and also volchonskoite, nontronite and sauconite. The clays herein are available under commercial names such as "fooler clay" (clay found in a relativeley thin vein above the main bentonite or montmorillonite veins in the Black Hills) and various trade names such as Thixogel No. 1, Gelwhite GP and, especially, Soft Clark, from Georgia Kaolin Co., Elizabeth, New Jersey; Volclay BO and Volclay No. 325, from American Colloid Co., Skokie, Illinois; Black Hills Bentonite BH 450, from International Minerals and Chemicals; and Veegum Pro and Veegum F, from R. T. Vanderbilt. It is to be recognized that such smectite minerals obtained under the foregoing commercial and trade names can comprise mixtures of the various discrete mineral entities. Such mixtures of the smectite minerals are suitable for use herein.

While any of the impalpable smectite clays having a cation exchange capacity of at least about 50 meq/100 grams are useful herein, certain clays are preferred. For example, Gelwhite GP and fooler clay are extremely white forms of smectite clays and are therefore preferred when formulating white, granular compositions. A particularly preferred clay mineral is that named Soft Clark, which is originally a primarily calcium-based montmorillonite. On the other hand, certain smectite clays, such as some marketed under the name "bentonite", are sufficiently contaminated by other silicate minerals that their ion exchange capacity falls below the requisite range, and such clays are of no use in the present compositions.

Appropriate clay minerals for use herein can be selected by virtue of the fact that smectites exhibit a true 14A x-ray diffraction periodicity. This characteristic periodicity, together with exchange capacity measurements performed in the manner noted above, provides a basis for selecting suitable impalpable smectite-type clay minerals for use in the granular detergent compositions disclosed herein.

The QA clays can be made by any suitable method. For instance they can be prepared by slurrying the untreated clay in a solution containing the quantity of the appropriate quaternary ammonium salt intended to be reacted with the clay, that is to provide the desired degree of ion exchange. The treated clay can then be separated from the liquor by known methods such as filtration or centrifuging. The dry or damp treated clay can be dry mixed with the other components of the detergent composition in granular form, or it may be slurried with water or with liquid components of the detergent composition, e.g. the nonionic surfactant, and sprayed on or otherwise mixed with the granular components.

For further discussion of the preparation of alkyl ammonium substituted clays generally, see U.S. Pat. No. 2,746,887 to O'Neil patented May 22, 1956 and U.S. Pat. No. 2,531,427 to Hauser patented Nov. 28, 1950, both of which are incorporated by reference.

The compositions of the invention are mainly intended for washing fabrics, whereby their textile softening properties are of most value. They normally contain the builders and other components usually included in such compositions. These are well known in the art, the particular substances chosen depending upon the intended use of the composition, the nature of the surfactant and so on.

Suitable detergent builder salts useful herein can be of the polyvalent inorganic and polyvalent organic types, or mixtures thereof. Examples of suitable water-soluble, inorganic alkaline detergent builder salts include the alkali metal carbonates, borates, phosphates, polyphosphates, tripolyphosphates, bicarbonates, and sulfates. Specific examples of such salts include the sodium and potassium tetraborates, perborates, bicarbonates, carbonates, tripolyphosphates, pyrophosphates, orthophosphates, and hexametaphosphates.

Examples of suitable organic alkaline detergency builder salts are: (1) water-soluble amino polyacetates, for example sodium and potassium ethylenediamine tetraacetates, nitrilotriacetates, and N-(2-hydroxyethyl)nitrilodiacetates; (2) water-soluble salts of phytic acid, for example sodium and potassium phytates; (3) water-soluble polyphosphonates, including sodium, potassium, and lithium salts of ethane-1-hydroxy-1,1-diphosphonic acid; sodium, potassium and lithium salts of methylenediphosphonic acid.

Additional organic builder salts useful herein include the polycarboxylate materials described in U.S. Pat. No. 3,364,103, including the water-soluble alkali metal salts of mellitic acid. The water-soluble salts of polycarboxylate polymers and co-polymers such as are described in U.S. Pat. No. 3,308,067, are also suitable for use herein. It is to be understood that while the alkali metal salts of the foregoing inorganic and organic polyvalent anionic builder salts are preferred for use herein from an economic standpoint, the ammonium, alkanolammonium, for example triethanolammonium and diethanolammonium, water-soluble salts of any of the foregoing builder anions are useful herein.

Mixtures of organic and/or inorganic builders can be used herein. One such mixture of builders is disclosed in Canadian Pat. No. 755,038, for example, a ternary mixture of sodium tripolyphosphate, trisodium nitrilotriacetate and trisodium ethane-1-hydroxy-1,1-diphosphonate.

While any of the foregoing alkaline polyanionic builder materials are useful herein, sodium tripolyphosphate, sodium nitrilotriacetate, sodium mellitate, sodium citrate and sodium carbonate are preferred herein for this builder use. Sodium tripolyphosphate is especially preferred herein as a builder both because of its detergency builder activity and its ability to disperse homogeneously and quickly the smectite clays throughouot the aqueous laundry medium without interfering with clay deposition on the fabric surface.

The detergent builders are used at concentrations of from 5–60% by weight of the compositions, generally in a ratio of 10:1 to 1:10 to the detergent. In predominantly synthetic detergent-based compositions the level of builder is more usually from 20 to 50%, in predominantly soap-based products it is more usually from 5 to 30%.

The detergent compositions disclosed herein can contain other materials commonly used in such compositions. For example, various soil-suspending agents such as carboxymethylcellulose, corrosion inhibitors, dyes, fillers such as sodium sulfate and silica, optical brighteners, suds-boosters, suds-depressants, germicides, anti-tarnishing agents, pH-adjusting agents such as sodium silicate, and enzymes, well known in the art for use in detergent compositions, can also be employed herein. Bound water can also be present in said detergent compositions. Normal product usage is from about 0.5 to about 1.5 cups of product per wash load.

The present invention is illustrated in and by the following Examples.

EXAMPLE I a. Two detergent compositions were prepared having the following compositions (percentages are by weight).

| | |
|---|---|
| Composition A | |
| Dobanol 45-E-7* | 12% |
| Tallow monoethanolamide | 4 |
| Sodium soap (90/10 Tallow/Coconut | 2 |
| Sodium tripolyphosphate | 35 |
| Sodium silicate | 7 |
| Sodium perborate | 25 |
| Sodium sulphate | 5 |
| Moisture and minor components | 10 |
| | 100% |

*Trade Name. Primary $C_{14}$ to $C_{15}$ alcohols with some methyl branching, condensed with 7 molar proportions of ethylene oxide.

| | |
|---|---|
| Composition B | |
| Sodium soap (80/20 Tallow/Coconut) | 49% |
| Tallow monoethanolamide | 2 |
| Sodium silicate | 10 |
| Sodium tripolyphosphate | 11 |
| Sodium perborate | 15 |
| Moisture and minor components | 13 |

-continued

| |
|---|
| 100% |

b. Two sodium montmorillonites (Thixogel, Gelwhite) and a calcium montmorillonite (Soft Clark) were converted into materials where 20% of the exchangeable cations were replaced by tetramethylammonium cations.

c. Cotton terry towelling was washed under the following conditions:

7 min. in a tergotometer at 120° C

Wash solution (i) 0.5% Composition A; (ii) 0.5% Composition A + 0.025% Quaternary Clay The softness of fabrics from (i) compared against (ii) was assessed by six panellists using the 0–4 preference scale.

RESULTS

1. Composition A + Quaternary Soft Clark was significantly preferred over Composition A for softening towels (1.2 psu; Yardstick 0.28).

2. Composition A + Quaternary Gelwhite was significantly preferred over Composition A (1.1 psu; Yardstick 0.36).

3. Composition A + Quaternary Thixogel was significantly preferred over Composition A (0.55 psu; Yardstick 0.42).

4. Using an unmodified clay (regular Soft Clark) in the same test, Composition A + Soft Clark was not significantly preferred over Composition A (0.25 psu; Yardstick 0.87). In the above, "psu" means "panel score units". The Yardstick is the least significant difference at 95% confidence level based on the variability of judgments of the same comparison.

EXAMPLE II

Samples of a calcium montmorillonite (Soft Clark) were converted into materials where 5%, 10%, 15% and 40% of the exchangeable cations were replaced by tetramethylammonium cations.

a. The 5% exchanged material (in a test similar to that of Example I) showed poorer performance than the 20% exchanged material. Cotton softening (against Composition A):0.5 psu, Yardstick 0.77.

b. The 10 and 40% exchanged materials performed similarly to the 20% exchanged.

EXAMPLE III

The Soft Clark quaternary (20% exchange; tetramethylammonium) was tested in Composition B.

a. 7 minute wash at 120°F in a tergotometer

Wash solution (i) 0.6% Composition B; (ii) 0.6% Composition B + 0.03% "Quaternary Soft Clark"; (iii) 0.6% Composition B + 0.03% Regular Soft Clark;

Cotton softening (in terms of psu); (i) Composition B - 1.41; (ii) Composition B + Quaternary Soft Clark, + 0.35; (iii) Composition B + Regular Soft Clark, + 1.06 Yardstick: 0.73

EXAMPLE IV

Samples of a calcium montmorillonite (Soft Clark) were converted into materials containing butyltrimethylammonium cations and hexyltrimethylammonium cations (20% exchange of cations).

7 minute wash at 120°F in tergotometer; (i) 0.5% Composition A; (ii) 0.5% Composition A + 0.025% Quaternary Clay

RESULTS (COTTON SOFTENING)

a. Composition A – 0.38; Composition A + Butyltrimethylammonium Soft Clark +0.38 (Yardstick 0.60)

b. Composition A, O; Composition A + hexyltrimethylammonium Soft Clark, O

What is claimed is:

1. A detergent composition comprising from about 5 to about 99% by weight of an organic anionic, nonionic, ampholytic or zwitterionic detergent, or a mixture thereof, and from about 1 to about 50% by weight of the composition of an impalpable smectite clay having an ion-exchange capacity of at least about 50 meg/100 grams, in which clay from about 5 to about 100 molar percent of the exchangeable cations are alkyl-substituted ammonium ions of the general formula $$R^1R^2R^3R^4N^+ \quad (1)$$

wherein each of $R^1$, $R^2$, $R^3$ and $R^4$ represents an alkyl group having 1 to 4 carbon atoms or hydrogen, provided that the total number of carbon atoms does not exceed 8, and that not more than any two of $R^1$, $R^2$, $R^3$ and $R^4$ represent hydrogen.

2. A composition according to claim 1, which comprises 2 to 30% by weight of a synthetic organic anionic, nonionic or zwitterionic detergent or a mixture thereof.

3. A composition according to claim 2, wherein not more than 80% by weight of the total organic detergent present is anionic.

4. A composition according to claim 3, wherein not more than 20% by weight of the organic detergent component is anionic.

5. A composition according to claim 1, wherein the organic detergent comprises predominantly one or more water-soluble soaps having 10–20 carbon atoms in the molecule, and constitutes from 10 to 60% by weight of the composition.

6. A composition according to claim 5 wherein the soaps are sodium and potassium soaps or mixtures thereof having 12 to 18 carbon atoms and constitute from 20 to 50% by weight of the composition.

7. A composition according to claim 5 which comprises from about 0.5 to about 20% by weight of a soap-curd dispersant.

8. A composition according to claim 7 which contains, as a curd dispersant, from 1 to 6% by weight of tallow monoethanolamide.

9. A composition according to claim 1 which contains from about 4 to about 25% of said clay.

10. A composition according to claim 9, which contains from about 5 to about 15% by weight of said clay.

11. A composition according to claim 9 wherein said clay is selected from montmorillonites, hectorites and saponites.

12. A composition according to claim 1 wherein from 10 to 40 molar percent of the exchangeable cations are alkyl-substituted ammonium ions of the formula (1).

13. A composition according to claim 1 in which the alkyl-substituted ammonium ions (1) are all tetra-alkyl ammonium ions.

14. A composition according to claim 13 wherein the alkyl-substituted ammonium ions are selected from the group consisting of tetramethylammonium and tetraethylammonium and mixtures thereof.

15. A composition according to claim 1 which also contains from about 5 to about 60% by weight of organic or inorganic detergency builder or mixtures thereof.

16. The composition of claim 2 wherein the organic detergent is a nonionic detergent.

17. The composition of claim 16 wherein the nonionic detergent is the condensation product of an aliphatic alcohol and ethylene oxide.

* * * * *

UNITED STATES PATENT OFFICE

CERTIFICATE OF CORRECTION

Patent No. 3,948,790 Dated April 6, 1976

Inventor(s) Peter Roscoe Hartley Speakman

It is certified that error appears in the above-identified patent and that said Letters Patent are hereby corrected as shown below:

Column 14, line 17, claim 1, "meg/100" should read -- meq/100 --.

Signed and Sealed this

Fifth Day of October 1976

[SEAL]

*Attest:*

RUTH C. MASON
*Attesting Officer*

C. MARSHALL DANN
*Commissioner of Patents and Trademarks*